J. H. GORDON.
Harvesters.

No. 146,526.

2 Sheets--Sheet 1.

Patented Jan. 20, 1874.

WITNESSES.
N. C. Gridley
F. F. Warner

INVENTOR.
John H. Gordon

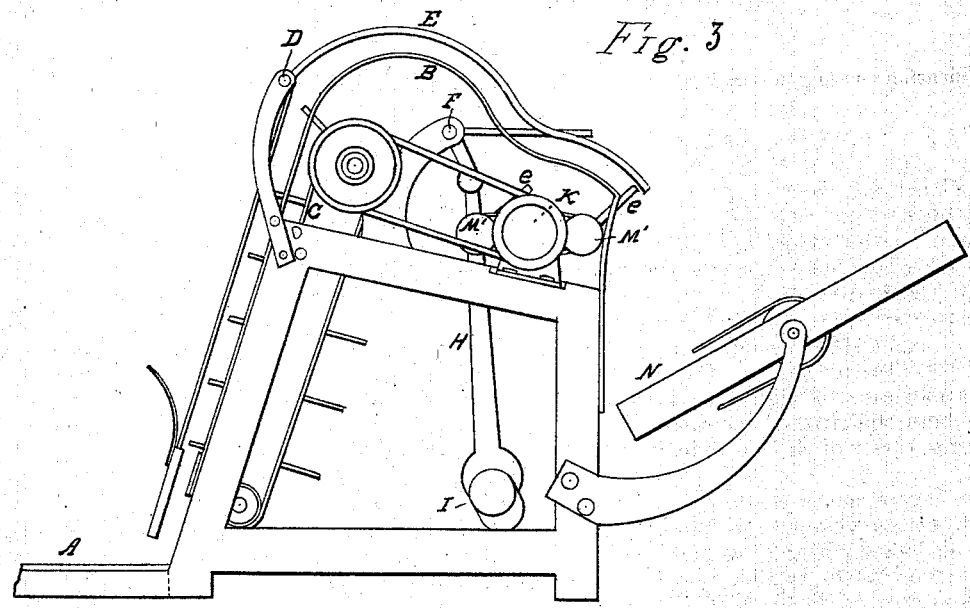
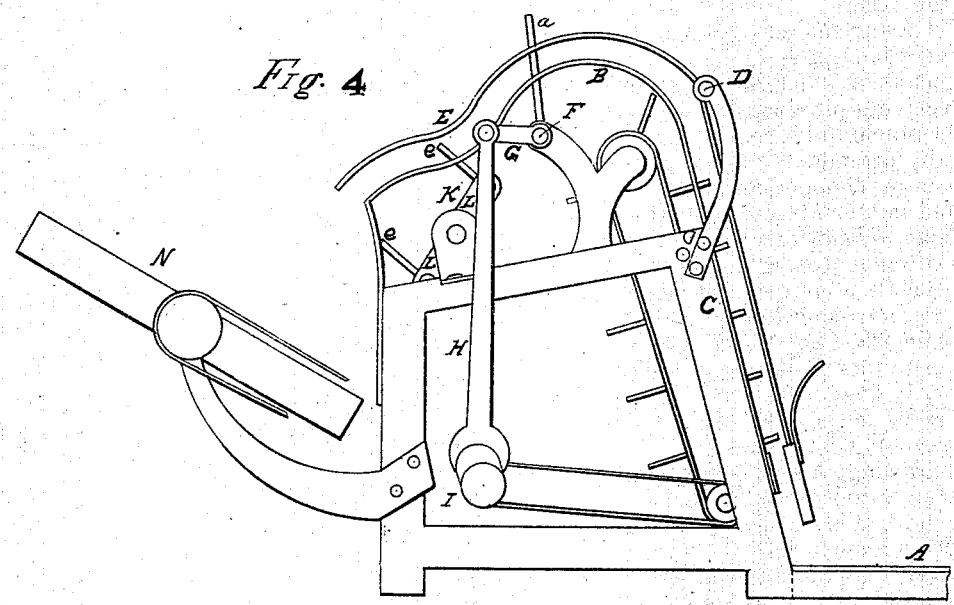

UNITED STATES PATENT OFFICE.

JOHN H. GORDON, OF KALAMAZOO, MICHIGAN.

IMPROVEMENT IN HARVESTERS.

Specification forming part of Letters Patent No. 146,526, dated January 20, 1874; application filed September 11, 1873.

*To all whom it may concern:*

Be it known that I, JOHN H. GORDON, of Kalamazoo, in the county of Kalamazoo and State of Michigan, have invented certain new and useful Improvements in Harvesters, of which improvements the following is a full, clear, and exact description, which will enable others skilled in the art to which my invention appertains to make and use the same, reference being had to the accompanying drawing forming a part of this specification, and in which—

Figure 1:
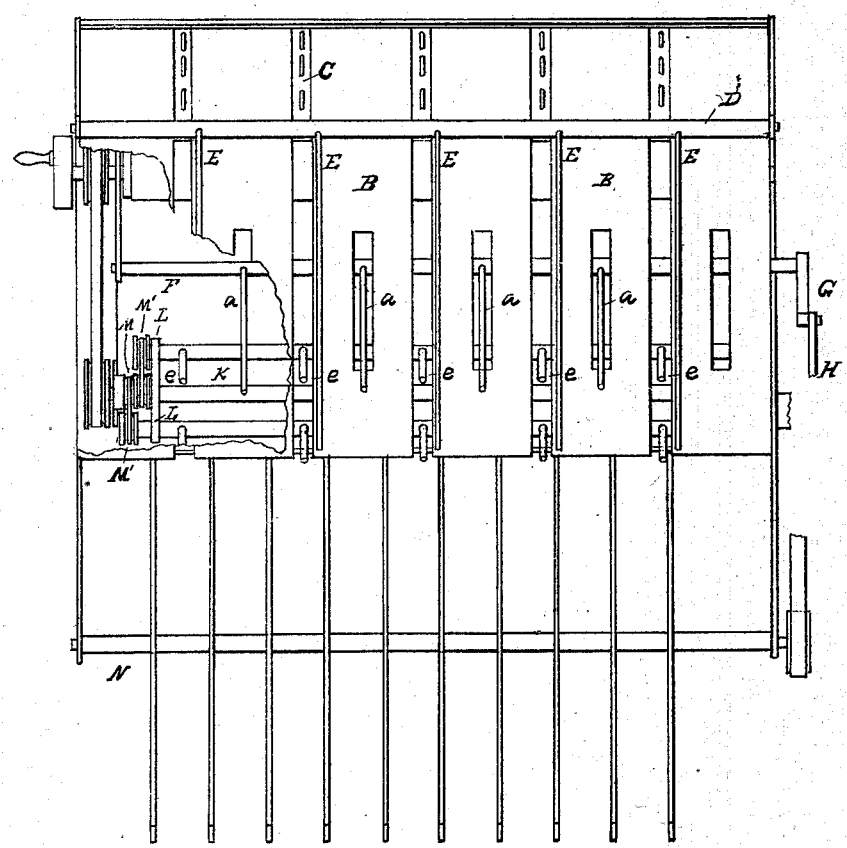
Figure 2:
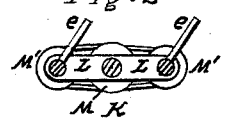

Figure 1 represents a top or plan view of that part of a harvester to which my improvements are applied; Fig. 2, an end view of the picker device detached; Fig. 3, a rear view of the parts shown in Fig. 1; and Fig. 4 a front view of the same.

Like letters of reference indicate like parts.

My invention relates to that class of harvesters by means of which the cut grain is carried from a receiving-platform and delivered either into a receptacle to be bound, either automatically or by attendants riding upon the machine, or into a dropper, and from thence upon the ground in a condition to be readily bound by attendants following the harvester. The object of my invention is to improve the means employed for the purpose of delivering the grain in a proper condition to be readily bound in any of the ways above referred to; and consists in certain novel features, hereinafter particularly described, relating to the means employed for the purpose of dividing the grain while a gavel is being removed.

In the drawing, A represents the platform which receives the grain immediately after it has been cut. B is a slotted platform to which the cut grain is next delivered. C is an endless elevator band or apron, provided with teeth extending through slots in that side of the platform B which is adjacent to the platform A. The apron C is set in operation by having its rollers connected with the driving mechanism of the machine, and when thus set in operation, the elevator-teeth convey the grain from the platform A to the top of the platform B. The top of this platform is inclined or curved, as shown, so that the grain, after being left by the elevator-teeth, will be easily crowded toward the opposite side of the platform. D is a rod or bar pivoted in bearings on the frame of the harvester, and E E are arms extending from the rod D to, or nearly to, the opposite side of the platform B. F is a rock-bar, arranged below the platform B, and *a a* are fixed teeth extending from the bar F through slots in the said platform. When the teeth *a a* are inoperative, they extend toward that side of the platform toward which the grain is carried, as shown in Fig. 3, so as not to form a barrier to it. G is a crank-arm on one end of the bar F, and H is a pitman pivoted to the end of the arm G. The lower end of the pitman H is operated upon in such a manner by the driving mechanism of the machine that an intermittent rocking movement will be communicated to the bar F and its teeth, the latter being thereby lifted up at intervals so that they will then form a barrier to the grain over the platform B, as shown in Fig 4, and while the teeth *a a* are in this position, the arms E E will prevent the grain from being crowded over them. I is a rotary shaft provided with a cam, on which the lower end of the pitman H rests, as shown in Figs. 3 and 4, and this cam is formed to give an intermittent vertical movement to the pitman.

If the teeth *a a* are not heavy enough to fall by the force of gravity after the pitman is released, they may be then forced, by means of springs or weights, into the position shown in Fig. 3.

It will be perceived from the foregoing description, that the grain will be continuously carried to the top of the platform B, and that it will be there stopped at intervals by means of the teeth *a a*. While the grain is thus stopped, the bundle accumulated either upon a dropper or a binding-platform, may be either dumped upon the ground or bound, either automatically or by binders on the machine, according to the provisions made for binding in the machine to which my improvements are applied.

In order that the grain may be swept from the platform B with certainty, I employ the means which I will now proceed to describe.

K is a reel, rotated continuously by being connected for that purpose to the driving mechanism of the machine. This reel may be arranged either above or below, or at the side, of the platform B, and e e are picker-teeth extending from the horizontal arms of the reel, and also through the slots of the platform B during a part of each rotation of the reel, as shown in Figs. 3 and 4. The teeth e e are inclined in the manner shown, in order that they may engage the grain with certainty and sweep it from the platform B, and it will be observed that the arms E E will hold the grain to the teeth e e. In order to prevent the teeth e e from clinging to grain, I arrange the horizontal arms of the reel freely in bearings in the radial arms L L, and the main shaft of the reel turns freely in a fixed sheave, M. I also fix sheaves M' M' on one end of each of the horizontal arms, and I then arrange a chain over each of the sheaves M' M', and carry these chains over the sheave M, as shown in Figs. 1, 2, and 3. By this means the teeth e e always retain the same inclination with respect to the platform B during the rotation of the reel, and instead of clinging to the grain, as they might do if they were radial to the main shaft of the reel at all times, they will be drawn from it at the proper time. The grain will thus be swept from the platform B with certainty, and will be prevented from being detained thereon near the ends of the arms E E. When a receiver or dropper is employed, as shown at N, the teeth e e will also pack the grain thereon.

Various means may be employed for the purpose of retaining the teeth e e in the same inclined position with relation to the platform B during the rotation of the reel, and I do not here intend to limit myself to the means herein shown and described as suitable for that purpose.

I am aware that rake-teeth, always radial to a rotary shaft, have heretofore been employed for the purpose of sweeping the grain from a platform corresponding to the platform B; but I do not here claim such.

Having thus described the nature and object, construction, and operation of my invention, what I claim as new, and desire to secure by Letters Patent, is—

1. In combination, the platform B, the intermittently-oscillating teeth or stoppers a a, extending through the platform, and the reel or picker K, having rotary horizontal arms provided with the teeth e e, all substantially as and for the purposes specified.

2. The rotary picker or reel, arranged in relation to the platform B, substantially as described, and having rotary horizontal arms provided with picker-teeth, substantially as and for the purposes specified.

3. The pivoted presser-arms E E, arranged over the platform B, in combination with the arms or teeth a a and the picker-teeth e e, for the purpose of preventing the grain from being crowded over the teeth a a, and to hold it to the teeth e e, substantially as specified.

4. The intermittently-oscillating teeth, extending through the platform and arranged, substantially as described, to admit of the passage of the grain over the platform until a gavel is formed, and to stop its passage until a gavel is removed, alternately, in combination with the crank-arm G and the pitman H, actuated by a rotary cam, substantially as and for the purposes specified.

JOHN H. GORDON.

Witnesses:
F. F. WARNER,
J. H. LAWLOR.